US012560184B2

(12) United States Patent
Kroll et al.

(10) Patent No.: US 12,560,184 B2
(45) Date of Patent: Feb. 24, 2026

(54) PIVOT ACTUATOR

(71) Applicant: BAR-PNEUMATISCHE STEUERUNGSSYSTEME GMBH, Dattenberg (DE)

(72) Inventors: Markus Kroll, Dattenberg (DE); Axel Kuhn, Niederbreitbach (DE)

(73) Assignee: BAR-PNEUMATISCHE STEUERUNGSSYSTEME GMBH, Dattenberg (DE)

( * ) Notice: Subject to any disclaimer, the term of this patent is extended or adjusted under 35 U.S.C. 154(b) by 18 days.

(21) Appl. No.: 18/370,265

(22) Filed: Sep. 19, 2023

(65) Prior Publication Data

US 2024/0003365 A1 Jan. 4, 2024

Related U.S. Application Data

(63) Continuation of application No. PCT/EP2022/055024, filed on Feb. 28, 2022.

(30) Foreign Application Priority Data

Mar. 19, 2021 (DE) ..................... 10 2021 106 884.3

(51) Int. Cl.
*F15B 15/06* (2006.01)
*F15B 15/24* (2006.01)

(52) U.S. Cl.
CPC .............. *F15B 15/06* (2013.01); *F15B 15/24* (2013.01)

(58) Field of Classification Search
CPC ............................... F15B 15/065; F15B 15/24
See application file for complete search history.

(56) References Cited

U.S. PATENT DOCUMENTS

| | | | |
|---|---|---|---|
| 5,139,230 A | 8/1992 | Lester | |
| 5,259,589 A | 11/1993 | Posner | |
| 6,655,256 B2 | 12/2003 | Niessen | |
| 9,199,358 B2 | 12/2015 | Balc et al. | |
| 2017/0146037 A1* | 5/2017 | Curtin | F15B 15/065 |
| 2021/0080023 A1 | 3/2021 | Shah | |
| 2024/0003364 A1 | 1/2024 | Kroll et al. | |

FOREIGN PATENT DOCUMENTS

| | | |
|---|---|---|
| CN | 211202472 | 8/2020 |
| DE | 10357911 | 7/2005 |
| DE | 102004004897 | 8/2005 |

(Continued)

OTHER PUBLICATIONS

English machine translation of DE-102004004897-A1 (Year: 2005).*

(Continued)

*Primary Examiner* — Randell J Krug
(74) *Attorney, Agent, or Firm* — Grossman, Tucker, Perreault & Pfleger, PLLC

(57) ABSTRACT

A pivot actuator comprising: a housing; a piston supported in the housing; a drive shalt protruding from the housing wherein the piston engages the drive shaft to rotate the drive shaft about a drive axis by a pivot angle between two end positions; and a switching cam coupled to the drive shaft and configured to contact a stop element in the two end positions, wherein the switching cam includes two discs arranged adjacent to one another along the drive axis.

18 Claims, 3 Drawing Sheets

(56) References Cited

FOREIGN PATENT DOCUMENTS

Figure 1:
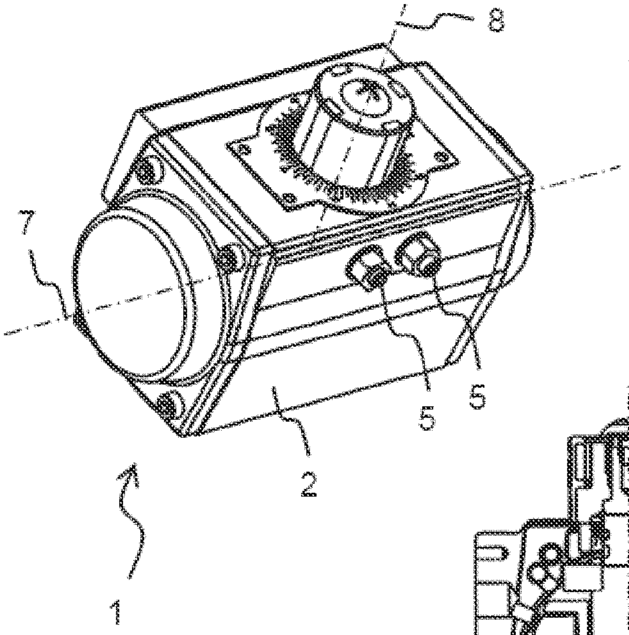

| | | | | |
|---|---|---|---|---|
| DE | 102004004897 A1 * | 8/2005 | ............ F15B 15/065 |
| DE | 102007012238 | 9/2007 | |
| DE | 102009005004 | 7/2010 | |
| EP | 2495449 | 9/2012 | |
| GB | 2182721 A | 5/1987 | |
| IT | MI20092229 | 6/2011 | |
| KR | 102030788 | 10/2019 | |
| WO | 2010063515 | 6/2010 | |

OTHER PUBLICATIONS

European Search Report from related Application No. 102021106889.3, dated Apr. 19, 2021. 20 pages. English translation attached.
Emerson Product Data Sheet, Keystone F89 Pneumatic Quarter-Turn Actuator, General Purpose/Hazardous Area, 2017, pp. 1-16.
European Search Report from related Application No. 102021106889.4, dated Apr. 20, 2021. 10 pages. English translation attached.
International Search Report and Written Opinion from corresponding PCT Appln. No. PCT/EP2022/055023, dated May 31, 2022. 9 pages.
International Search Report and Written Opinion from corresponding PCT Appln. No. PCT/EP2022/055024, dated May 31, 2022. 8 pages.
SIL Safety Manual, Keystone Rack and Pinion Pneumatic Actuator F89 Series, Safety Guide R&P—SIL Rev. 1, Feb. 2019, pp. 1-8.
International Preliminary Report on Patentability from corresponding PCT Appln. No. PCT/EP2022/055024, dated Sep. 28, 2023. 7 pages.

* cited by examiner

PIVOT ACTUATOR

CROSS REFERENCE TO RELATED APPLICATIONS

This application is a continuation of International application No. PCT/EP2022/055024 filed Feb. 28, 2022, which claims priority to DE Application 102021106884.3, filed Mar. 19, 2021, both of which are incorporated by reference herein in their entirety.

The invention relations to a pivot actuator including a housing, a piston that is supported in the housing and displaceable along a longitudinal axis of the housing, a drive shaft that protrudes from the housing, wherein the piston engages the drive shaft by form locking so that the drive shaft is pivoted about a drive axis by a pivot angle between two end positions by a displacement of the piston; and a switching cam that is fixed torque proof at the drive shaft and configured to contact a stop element at the housing with a respective contact surface of the switch cam in the two end positions.

A generic pneumatic pivot actuator is known e.g. under the product designation Keystone Figure 89 by Emerson Electric Co. St. Louis, MI/US. The known pivot actuator has a pivot angle of 90 degrees. The known pivot actuator includes a disc shaped switching cam with two radial protrusions that are arranged mirror symmetrically about the drive shaft. Both end positions are respectively adjustable by a pivot angle of 10 degrees by threading the stop elements in the disc plane into the housing or out of the housing. The protrusions contact respective end surfaces of the stop elements with S-shaped contact surfaces of the protrusions in the end positions.

OBJECT

It is an object of the invention to configure the pivot angle continuously variable.

Solution

Improving upon the known pivot actuator it is proposed according to the invention to configure the switching cam from two discs that are arranged adjacent to each other along the drive axis, wherein one of the two stop surfaces is respectively arranged at each of the discs. In order to adjust the pivot angle in a pivot actuator the discs are pivotable relative to each other about the pivot axis. In different pivot actuators, different pivot angles can be implemented by using identical discs. Stocking switching cams for different pivot angles is thus simplified in particular when the discs are identical.

Advantageously the drive shaft in a pivot actuator according to the invention includes a teething wherein the discs are arranged torque proof at the teething. Through the external teething of the drive shaft and a corresponding inner teething of the discs the switching cam is supported torque proof in a particularly simple manner.

Advantageously the teething is rotation symmetrical in a pivot actuator according to the invention. The discs can then be applied to the drive shaft ill different angular orientations. When the timing of the teething corresponds to the adjustment angle for the adjustment the end position is adjustable in all intermediary positions between two adjacent positions of the disc. When the adjustment angle is 45 degrees the teething can be 8 times rotation symmetrical.

Advantageously at least one of the end positions is adjustable about the drive axis over an actuation angle of at least 10 degrees in a pivot actuator according to the invention. Advantageously the actuation angle is adjustable in a pivot actuator according to the invention by displacing the stop element along a displacement axis that is arranged transversal to the drive axis, advantageously by threading the stop element about the adjustment axis. Adjusting the end positions, in particular by threading a stop element back and forth is well known in the art.

Advantageously a pivot actuator according to the invention includes spring elements between the housing and the piston wherein the spring elements urge the piston into a neutral position within the pivot angle arrange. Advantageously a pivot actuator according to the invention includes a pressure tight chamber defined within the piston and a fluid connection at the chamber wherein the piston is moveable by loading the fluid connection with a fluid. Spring actuated resetting of the piston of a pivot actuator is well known in the art as well as the loading with a fluid.

Advantageously a pivot actuator according to the invention includes a pressure tight second chamber defined by the piston and a second fluid connection at the second chamber, wherein the piston is moveable back and forth by loading the second fluid connection. Advantageously a pivot actuator according to the invention includes a second piston that is moveable in the housing along a longitudinal axis wherein the second piston engages the drive shaft by form locking so that the drive shaft is pivoted relative to the first piston when the second piston is moved. A double acting piston as well as a pivot actuator with two counter acting pistons is well known in the art.

EMBODIMENTS

Figure 2A:
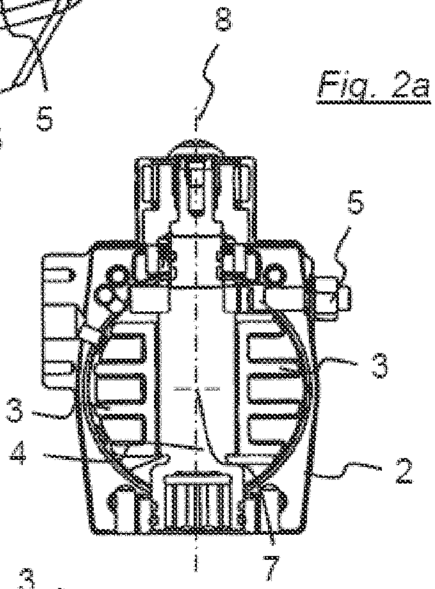
Figure 2B:
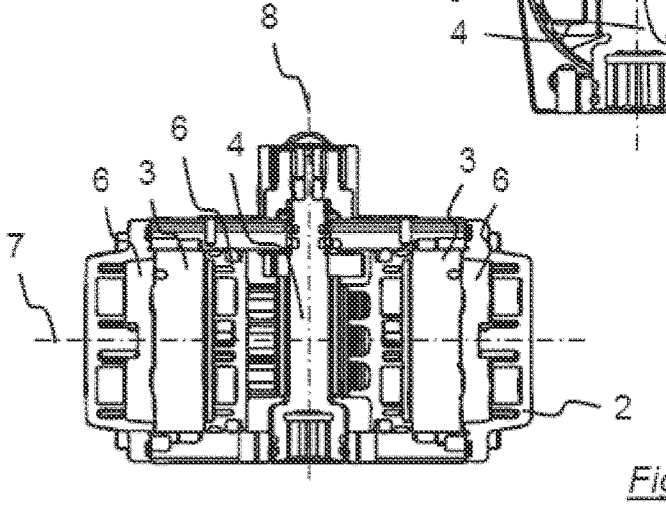
Figure 3A:
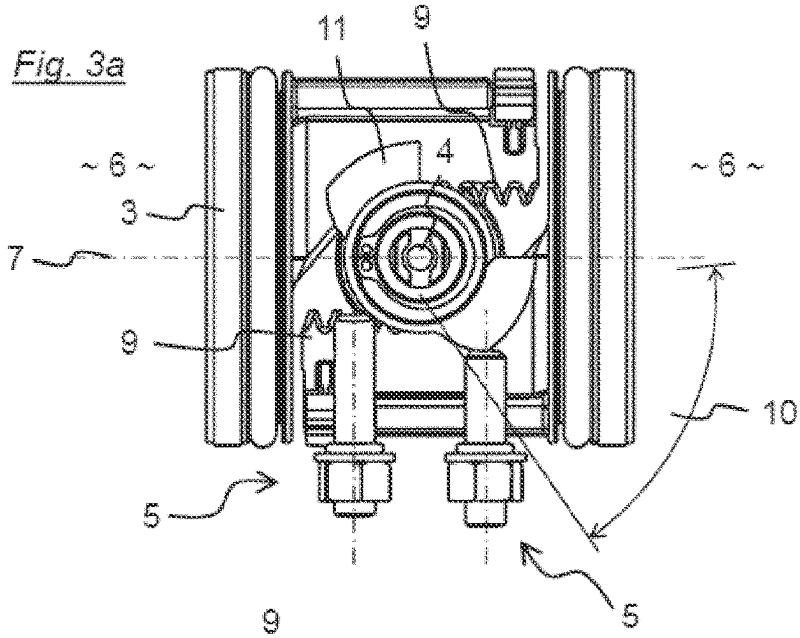
Figure 3B:
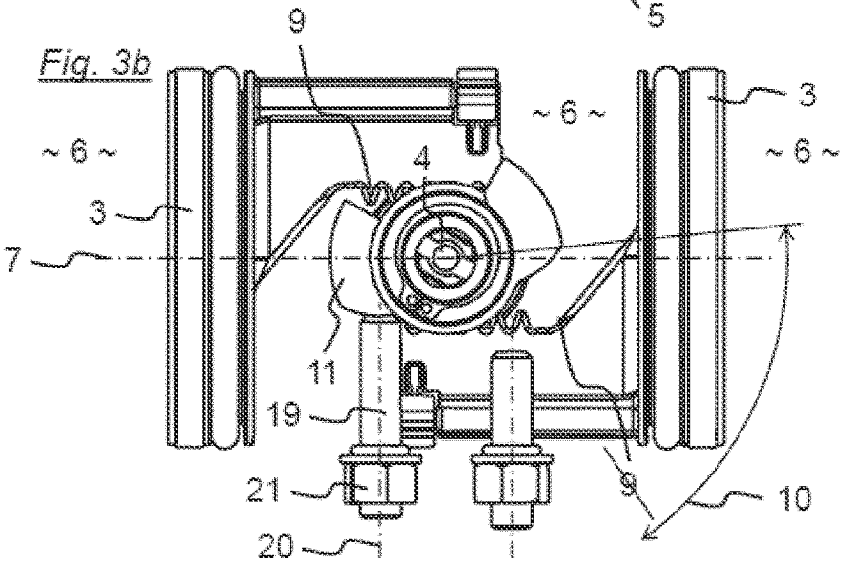
Figure 4A:
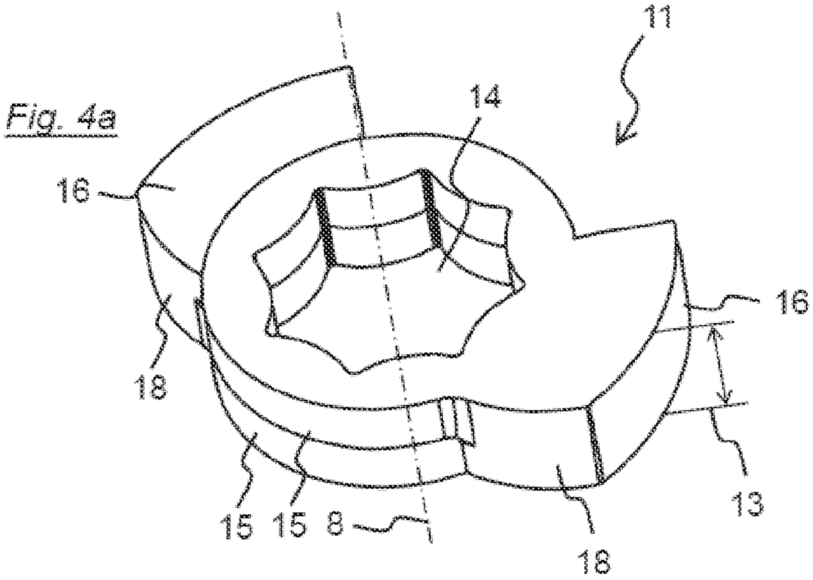

The invention is subsequently described based on embodiments with reference to drawing figures, wherein:

FIG. 1 illustrates a pivot actuator according to the invention;

FIG. 2*a/b* illustrates two sectional views of the pivot actuator;

FIG. 3*a/b* illustrates an internal view of the pivot actuator in two end positions;

FIG. 4*a* illustrates a switching cam of the pivot actuator; and

Figure 4B:
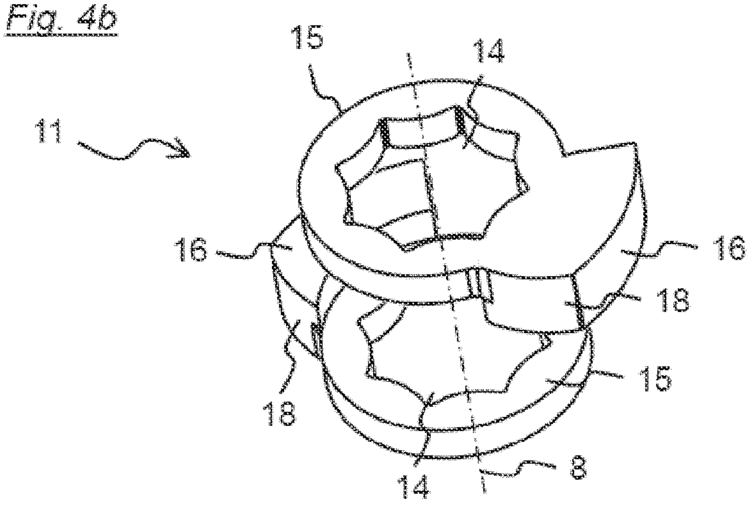

FIG. 4*b* illustrates an exploded view of the switching cam.

The pivot actuator 1 according to the invention shown in FIGS. 1, 2*a/b*, 3*a/b* includes a housing 2, two pistons 3 included in the housing 2 and a drive shaft 4 that protrudes from the housing 2 and two stop elements 5.

The pistons 3 define one pressure tight chamber 6 between each other and two pressure tight chambers 6 in cooperation with the housing 2. The pistons 3 are displaceable in the housing 2 counteracting along a longitudinal axis 7 of the housing 2 and the driveshaft 4 is pivotable about its driveshaft axis 8.

The pistons 3 and the driveshaft 4 include teethings 9 that engage each other by form locking. Loading the chamber 6 through non-illustrated pressure connections at the housing 2 with compressed air moves the pistons 3 and the drive shaft 4 is pivoted by the teethings 9 by a pivot angle 10 between two end positions at 0 degrees and 60 degrees illustrated in FIGS. 3*a/b*.

A switching earn 11 is attached at the drive axis 8 in the housing 2 and illustrated in detail in FIGS. 4*a/b*, and 5. The switching cam 11 has a circular disc shaped base structure with a diameter 12 of 30 mm and a thickness 13 of 9 mm and includes an axial receiving opening 14. The receiving opening 14 is shaped as an eight pointed star with rounded corners that fixes the switching cam 11 on the drive shaft 4 through a longitudinal teething.

The switching cam 11 includes two discs 15 that are rotated relative to each other transversal to the drive axis 8 and that are loosely placed on top of each other made from the case-hardened material 1.0503/C45 respectively including a radial protrusion 16 that has a thickness of the switching cam 11 and a radius 17 of 24.5 mm. A respective contact surface 18 is configured at the protrusion 16.

The stop elements 5 respectively include a set screw 19 that is threaded along an adjustment axis 20 into the housing 2 and a locking nut 21 that locks the set screw 19 at the housing 2. The pivot actuator 1 has a nominal pivot angle of 90 degrees.

Two other advantageous pivot actuators differ from the pivot actuator 1 according to the invention only in that one of the discs 15 is pivoted by 45 degrees or 90 degrees about the drive axis compared to the pivot actuator 1 according to the invention. The latter two pivot actuators thus have a nominal pivot angle of 135 degrees or 180 degrees.

REFERENCE NUMERALS AND DESIGNATIONS

1 Pivot Actuator
2 Housing
3 Piston
4 Drive shaft
5 Stop element
6 Chamber
7 Longitudinal axis
8 Drive Axis
9 Teething
10 Pivot Angle
11 Switching Cam
12 Diameter
13 Thickness
14 Receiving Opening
15 Disc
16 Protrusion
17 Radius
18 Contact Surface
19 Set Screw
20 Adjustment Axis
21 Locking Nut

What is claimed is:

1. A pivot actuator, comprising:

a housing;

a piston disposed within the housing and displaceable along a longitudinal axis of the housing;

a drive shaft rotatably coupled to the housing, wherein the piston engages the drive shaft so that movement of the piston within the housing causes the drive shaft to pivot in a first direction about a drive axis within a first pivot angle to a first end position and to pivot in a second direction about the drive axis within a second pivot angle to a second end position;

a first stop element configured to adjustably select the first end position;

a second stop element configured to adjustably select the second end position;

a switching cam configured to be coupled to and pivot with the drive shaft about the drive axis in the first and second directions, the switching cam including:

a first disc configured to be coupled to and pivot with the drive shaft about the drive axis, the first disc including a first central region and a first radial protrusion extending outwardly from the first central region, the first central region having a thickness parallel to the drive axis and configured to be coupled to the drive shaft and the first radial protrusion having a thickness parallel to the drive axis and including a first stop surface configured to contact the first stop element to limit rotation of the drive shaft in the first direction about the drive axis to the first end position, wherein the thickness of the first radial protrusion is greater than the thickness of the first central region; and a second disc configured to be coupled to and pivot with the drive shaft about the drive axis, the second disc including a second central region and a second radial protrusion extending outwardly from the second central region, the second central region having a thickness parallel to the drive axis and configured to be coupled to the drive shaft and the second radial protrusion having a thickness parallel to the drive axis and including a second stop surface configured to contact the second stop element to limit rotation of the drive shaft in the second direction about the drive axis to the second end position, wherein the thickness of the second radial protrusion is greater than the thickness of the second central region.

2. The pivot actuator of claim 1, wherein the first end position is adjustably selected by moving the first stop element along a first adjustment axis transversal to the drive axis.

3. The pivot actuator of claim 1, wherein the first disc and the second disc are offset along the drive axis.

4. The pivot actuator of claim 1, wherein the first disc is configured to be coupled to the drive shaft prior to the second disc being coupled to the drive shaft.

5. The pivot actuator of claim 1, wherein a combined thickness of the first and second central regions is substantially the same as the thickness of either the first or second radial protrusions.

6. The pivot actuator of claim 1, wherein the first and second discs are configured to be coupled to and nested along the drive shaft.

7. The pivot actuator of claim 1, the thickness of the first and second radial protrusions is substantially the same and a combined thickness of the first and second central regions is substantially the same as the thickness of the first and second radial protrusions.

8. The pivot actuator of claim 1, wherein the first central region and the second central region are configured to contact each other when the first disc and the second disc are coupled to the drive shaft.

9. The pivot actuator of claim 1, wherein the first central region has a first top surface and a first bottom surface, and wherein the first radial protrusion has a first upper surface coextensive with the first top surface and a first lower surface which extends beyond the first bottom surface in a first direction parallel to the drive axis when the first disc is coupled to the drive shaft; and wherein the second central region has a second top surface and a second bottom surface, and wherein the second radial protrusion has a second upper surface coextensive with the second top surface and a second lower surface which extends beyond the second bottom surface in a second direction parallel to the drive axis and opposite to the first direction when the second disc is coupled to the drive shaft.

10. The pivot actuator of claim 1, wherein the first central region includes a first axial receiving opening and wherein the second central region includes a second axial receiving opening.

11. The pivot actuator of claim 10, wherein the first and the second axial receiving openings include a star shape.

12. The pivot actuator of claim 10, wherein the first and the second axial receiving openings include an eight pointed star.

13. A pivot actuator, comprising:

a housing;

a piston configured to be moveably disposed within the housing;

a drive shaft rotatably coupled to the housing, wherein the piston engages the drive shaft so that reciprocal movement of the piston within the housing causes the drive shaft to pivot in a first direction about a drive axis to a first end position and to pivot in a second direction about the drive axis to a second end position;

a first stop element configured to adjustably select the first end position;

a second stop element configured to adjustably select the second end position;

a switching cam including:

a first disc configured to be removable secured to the drive shaft and rotate about the drive axis, the first disc including a first central region and a first radial protrusion extending outwardly from the first central region, the first central region having a thickness parallel to the drive axis and configured to be coupled to the drive shaft, the first radial protrusion having a thickness parallel to the drive axis and including a first stop surface configured to contact the first stop element to limit rotation of the drive shaft in the first direction about the drive axis to the first end position; and a second disc to be removable secured to the drive shaft and rotate about the drive axis, the second disc including a second central region and a second radial protrusion extending outwardly from the second central region, the second central region having a thickness parallel to the drive axis and configured to be coupled to the drive shaft, the second radial protrusion having a thickness parallel to the drive axis and including a second stop surface configured to contact the second stop element to limit rotation of the drive shaft in the second direction about the drive axis to the second end position;

wherein a combined thickness of the first and second central regions is substantially the same as the thickness of either the first or second radial protrusions; and wherein the first disc may be secured to the drive shaft independently from securing the second disc to the drive shaft.

14. The pivot actuator of claim 13, wherein the first disc and the second disc are offset along the drive axis.

15. The pivot actuator of claim 13, wherein the first and second discs are configured to be coupled to and nested along the drive shaft.

16. The pivot actuator of claim 13, wherein:

the first central region and the second central region include a first and a second axial receiving opening, respectively, the first and the second axial receiving openings being configured to be advanced over and aligned in a plurality of positions relative to the drive shaft.

17. The pivot actuator of claim 13, the thickness of the first and second radial protrusions is substantially the same and the combined thickness of the first and second central regions is substantially the same as the thickness of the first and second radial protrusions.

18. A pivot actuator, comprising:

a housing;

a piston that is supported in the housing and displaceable along a longitudinal axis of the housing;

a drive shaft rotatably coupled to the housing, wherein the piston engages the drive shaft so that the drive shaft is pivoted about a drive axis by a pivot angle between two end positions through a displacement of the piston; and a switching cam including a first disc arranged on top of and contacting a second disc along the drive axis, each disc configured to be coupled to and pivot with the drive shaft about the drive axis and including a contact surface, wherein the pivot angle can be adjusted by arranging the first and second discs on top of each other along the drive shaft in different angular orientations.

* * * * *